US009731692B2

(12) United States Patent
Yatabe

(10) Patent No.: US 9,731,692 B2
(45) Date of Patent: Aug. 15, 2017

(54) BRAKE BOOSTER INPUT ROD

(71) Applicant: NISSIN KOGYO CO., LTD., Ueda, Nagano (JP)

(72) Inventor: Shuuichi Yatabe, Nagano (JP)

(73) Assignee: AUTOLIV NISSIN BRAKE SYSTEMS JAPAN CO., LTD., Nagano (JP)

( * ) Notice: Subject to any disclaimer, the term of this patent is extended or adjusted under 35 U.S.C. 154(b) by 295 days.

(21) Appl. No.: 14/541,898

(22) Filed: Nov. 14, 2014

(65) Prior Publication Data

US 2015/0135945 A1 May 21, 2015

(30) Foreign Application Priority Data

Nov. 18, 2013 (JP) .................................. 2013-238303

(51) Int. Cl.
*F16J 3/04* (2006.01)
*B60T 11/18* (2006.01)

(52) U.S. Cl.
CPC ............... *B60T 11/18* (2013.01); *F16J 3/042* (2013.01)

(58) Field of Classification Search
CPC ........ B60T 13/00; B60T 11/18; B60T 13/569; B60T 13/57
See application file for complete search history.

(56) References Cited

U.S. PATENT DOCUMENTS 5,711,202 A * 1/1998 Tsubouchi .............. B60T 13/72
91/367
2006/0288859 A1* 12/2006 Tsubouchi .............. B60T 13/57
91/369.2

FOREIGN PATENT DOCUMENTS

| JP | S50104752 | 8/1975 |
| JP | H09047833 | 2/1997 |
| JP | H11152029 | 6/1999 |
| JP | 2006282001 | 10/2006 |
| JP | 2011131696 | 7/2011 |

OTHER PUBLICATIONS

Japanese Office Action for related JP application No. 2013-238303 dated Sep. 30, 2015, 6 pages.

* cited by examiner

*Primary Examiner* — Logan Kraft
*Assistant Examiner* — Abiy Teka
(74) *Attorney, Agent, or Firm* — Andrew M. Calderon; Roberts Mlotkowski Safran Cole & Calderon, P.C.

(57) ABSTRACT

An embodiment discloses a brake booster input rod, including: a front end portion to which an input piston of a brake booster is connected; a rear end portion to which a yoke connected with to a brake pedal is attached; and an annular boot installing groove to be engaged with, when a boot covers a front portion of the input rod, a rear end bead portion of the boot with a fastening margin. Through rolling, two annular groove portions and an annular ridge portion are formed to each have a triangular section. The ridge portion functions as a rear side wall of the boot installing groove.

16 Claims, 3 Drawing Sheets

BRAKE BOOSTER INPUT ROD

CROSS-REFERENCE TO RELATED APPLICATION(S)

This application claims priority from Japanese Patent Application No. 2013-238303 filed on Nov. 18, 2013, the entire contents of which are incorporated herein by reference.

FIELD

An embodiment described herein generally relates to a brake booster input rod in which an input piston of a brake booster is connected to a front end portion and a yoke that connects to a brake pedal is attached to a rear end portion thereof, and more particularly to an improved input rod having an annular boot installing groove formed on an outer circumferential surface of a middle portion of the input rod for installing thereat a rear end bead portion of a boot adapted to cover a front portion of the input rod with a fastening margin.

BACKGROUND

For example, JP-2011-131696-A discloses an input rod for a vacuum brake booster, and JP-2006-282001-A discloses an input rod for a hydraulic brake booster.

In obtaining an input rod for a brake booster, for example, a round rod is forged to produce a semi-finished input rod product having a main shaft portion of an input rod. Thereafter, a boot installing groove is formed on an outer circumference of a middle portion of the semi-finished input rod product through cutting, and an external thread on which a yoke is screwed is formed at a rear end portion of the semi-finished input rod product through rolling. In these working steps, particularly, the boot installing groove cutting takes a relatively long time. Additionally, cuttings need to be disposed of, and this tends to increase the production costs, making it difficult to reduce the product price.

SUMMARY

One object of the invention is to provide an input rod like the input rods for the brake boosters described above that can be produced easily and inexpensively.

First aspect of the invention provides a brake booster input rod, including: a front end portion to which an input piston of a brake booster is connected; a rear end portion to which a yoke connected with to a brake pedal is attached; and an annular boot installing groove formed on an outer circumferential surface of a middle portion of the input rod, so that, when a boot covers a front portion of the input rod, the boot installing groove is engaged with a rear end bead portion of the boot with a fastening margin, wherein, through rolling, two annular groove portions are formed side by side on an outer circumferential surface of the input rod along an axial direction thereof to each have a triangular section, and an annular ridge portion are risen between the groove portions to have a triangular section; and wherein the ridge portion functions as a rear side wall of the boot installing groove.

Second aspect of the invention provides, based on the above-mentioned configuration, the brake booster input rod, wherein the front groove portion is formed so as to be bitten by the rear end bead portion, when the rear end bead portion of the boot is installed in the boot installing groove.

Third aspect of the invention provides, based on the above-mentioned configuration, the brake booster input rod, wherein the rear end portion of the input rod includes an external thread onto which the yoke is screwed, and wherein the external thread are formed through the rolling at which the groove portions and the ridge portion are formed.

According to the first aspect of the invention, the annular groove portions each having the triangular section are formed at the two locations situated side by side in the axial direction on the outer circumferential surface of the input rod through rolling to thereby cause the annular ridge portion having the triangular section to rise between the groove portions, and the ridge portion is made to function as the rear side wall of the boot installing groove. Therefore, the boot installing groove can be formed easily through rolling, and hence, cuttings such as those produced in cutting are not produced, which can contribute to a reduction in production cost.

According to the second aspect of the invention, with the rear end bead portion installed in the boot installing groove, the rear end bead portion is made to bite into the front groove portion, and therefore, the movement of the rear end bead portion in the boot installing groove can be restricted by making use of the groove portion in an ensured fashion.

According to the third aspect of the invention, the external thread onto which the yoke is screwed is formed at the rear end portion of the input rod in the same step as that where the groove portions and the ridge portion are formed through the rolling through which the groove portions are formed. Therefore, the boot installing groove and the external thread can be formed altogether at one time through the same rolling, thereby making it possible to realize a further reduction in production cost.

DETAILED DESCRIPTION

An embodiment will be described with reference to the drawings.

Figure 1:
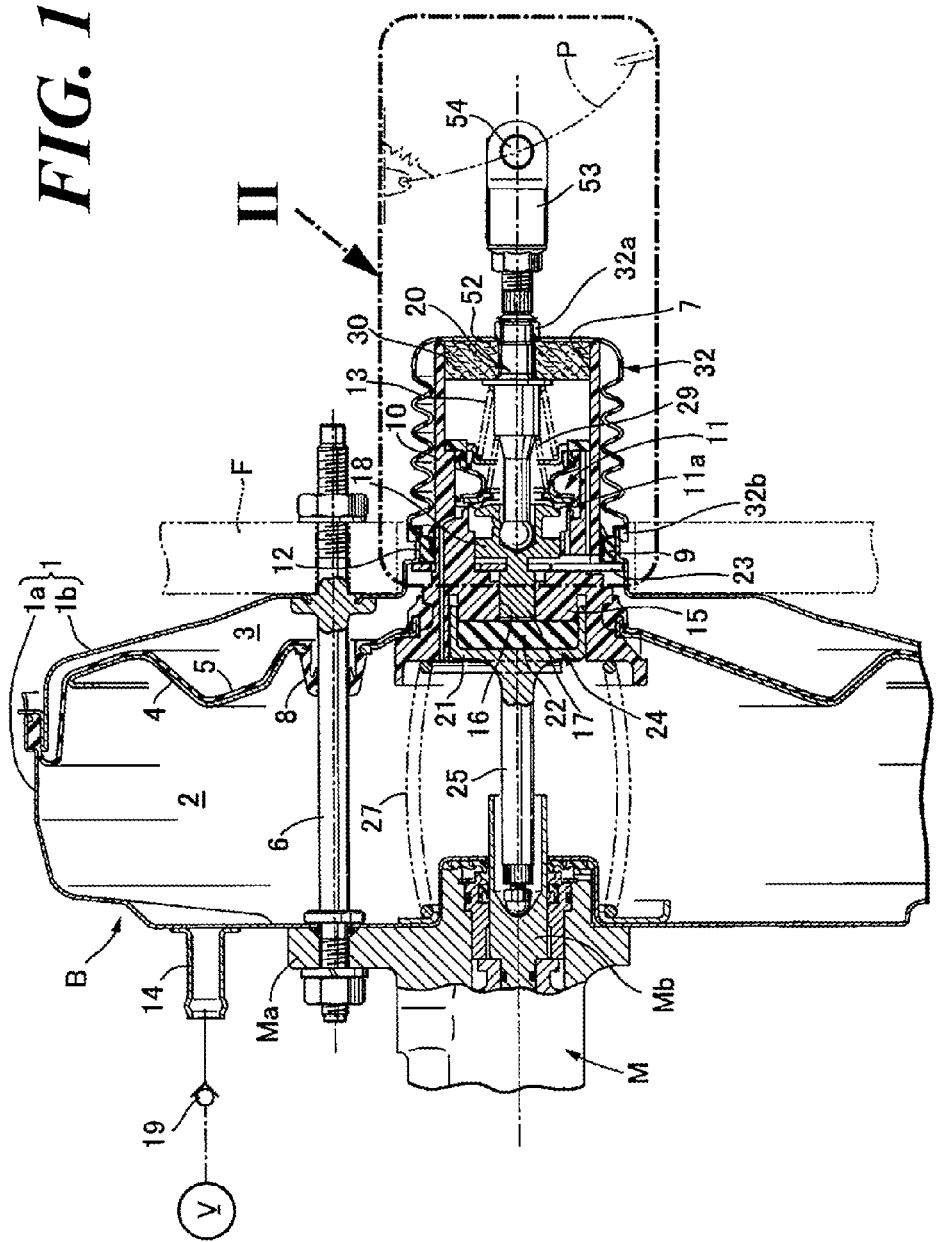
FIG. 1 is a vertical side view of a vacuum brake booster according to an embodiment.

In FIG. 1, a booster shell 1 of a vacuum brake booster B includes a front shell half member 1a and a rear shell half member 1b that are each formed into a cup shape and that are connected to each other at facing ends thereof. The front shell half member 1a and the rear shell half member 1b are each formed of a sheet of steel, and the front shell half member 1a and the rear shell half member 1b are connected together via a pair of steel tie-rods 6 (only one of them shown in FIG. 1). The pair of tie-rods 6 are disposed so as to be aligned side by side across a center axis of the booster shell 1. A mounting flange Ma of a motor vehicle brake master cylinder M is connected to a front surface of the front shell half member 1a by making use of these tie-rods 6. The rear shell half member 1b is fastened to a front surface of a motor vehicle body F by making use of the tie-rods 6.

An interior of the booster shell 1 is divided into a front vacuum chamber 2 and a rear working chamber 3 by a diaphragm 5 that is securely held between the front shell half member 1a and the rear shell half member 1b. A booster piston 4 is provided so as to be superposed on a front surface of the diaphragm 5, and this booster piston 4 can reciprocate backwards and forwards within the booster shell 1. Cylindrical slide seals 8 are formed integrally on the diaphragm 5. The cylindrical slide seals 8 penetrate a middle portion of the booster piston 4 in an airtight fashion so as to slide on the corresponding tie-rods 6. End portions of the front shell half member 1a and the rear shell half member 1b that face each other are crimp connected to each other with an outer circumferential bead portion of the diaphragm 5 held therebetween.

A resin valve cylinder 10 is connected integrally to central portions of the booster piston 4 and the diaphragm 5. This valve cylinder 10 is slidably supported in a bearing cylinder 12 via a bearing bush 9, and the bearing cylinder 12 is provided on a central portion of the rear shell half member 1b so as to project therefrom to the rear.

The vacuum chamber 2 is connected to a vacuum source V (for example, an interior of an intake manifold of an internal combustion engine) via a vacuum induction pipe 14 and a check valve 19.

A rear end portion of the valve cylinder 10 constitutes an atmosphere introducing port 7 that introduces the atmosphere into the valve cylinder 10. A filter 30 is loaded in this atmosphere introducing port 7. An input rod 20 that is connected to a brake pedal P and a control valve 11 are provided within the valve cylinder 10. The control valve 11 switches the communication of the working chamber 3 between with the vacuum chamber 2 and the atmosphere introducing port 7 in response to forward and backward movements of the input rod 20. Namely, the control valve 11 has a known configuration in which the control valve 11 cuts off the communication of the working chamber 3 with the atmosphere introducing port 7 to allow the working chamber 3 to communicate with the vacuum chamber 2 when the input rod 20 withdraws, whereas when the input rod 20 advances forwards, the control valve 11 cuts off the communication of the working chamber 3 with the vacuum chamber 2 to allow the working chamber 3 to communicate with the atmosphere introducing port 7. An input return spring 13 is provided in a compressed state between the input rod 20 and the valve cylinder 10 so as to bias the input rod 20 in the withdrawal direction. A valve spring 29 is provided in a compressed state between the input rod 20 and a valve body 11a of the control valve 11 so as to bias the valve body 11a to the front.

The control valve 11 includes a valve piston 18, and this valve piston 18 fits in the valve cylinder 10 and is connected to a front end portion of the input rod 20. A reaction piston 17 is formed at a front end of the valve piston 18.

A key member 23 is attached to the valve cylinder 10, and this key member 23 is brought into abutment with a front end portion of the bearing cylinder 12 to define a withdrawal limit for the valve cylinder 10 and the input rod 20.

A working piston 15 and a small-diameter cylinder bore 16 are provided in the valve cylinder 10. The working piston 15 project to the front, and the small-diameter piston bore 16 penetrates a central portion of the working piston 15. The reaction piston 17 is slidably fitted in the small-diameter cylinder bore 16. A cup member 21 is slidably fitted on an outer circumference of the working piston 15, and a flat elastic piston 22 is loaded in the cup member 21. The elastic piston 22 faces the working piston 15 and the reaction piston 17.

An output rod 25 is connected to a front surface of the cup member 21. Consequently, the output rod 25 is supported slidably on the valve cylinder 10 via the cup member 21. The output rod 25 is connected to a rear end portion of a master pin Mb of the master cylinder M that penetrates a central portion of the front shell half member 1a.

Thus, the working piston 15, the reaction piston 17, the elastic piston 22 and the cup member 21 make up a reaction mechanism 24 that feeds part of an output of the output rod 25 back to the input rod 20.

A booster return spring 27 is provided in a compressed state between a front wall of the booster shell 1 and a front end face of the valve cylinder 10, and this booster return spring 27 biases the valve cylinder 10 in the withdrawal direction.

Figure 2:
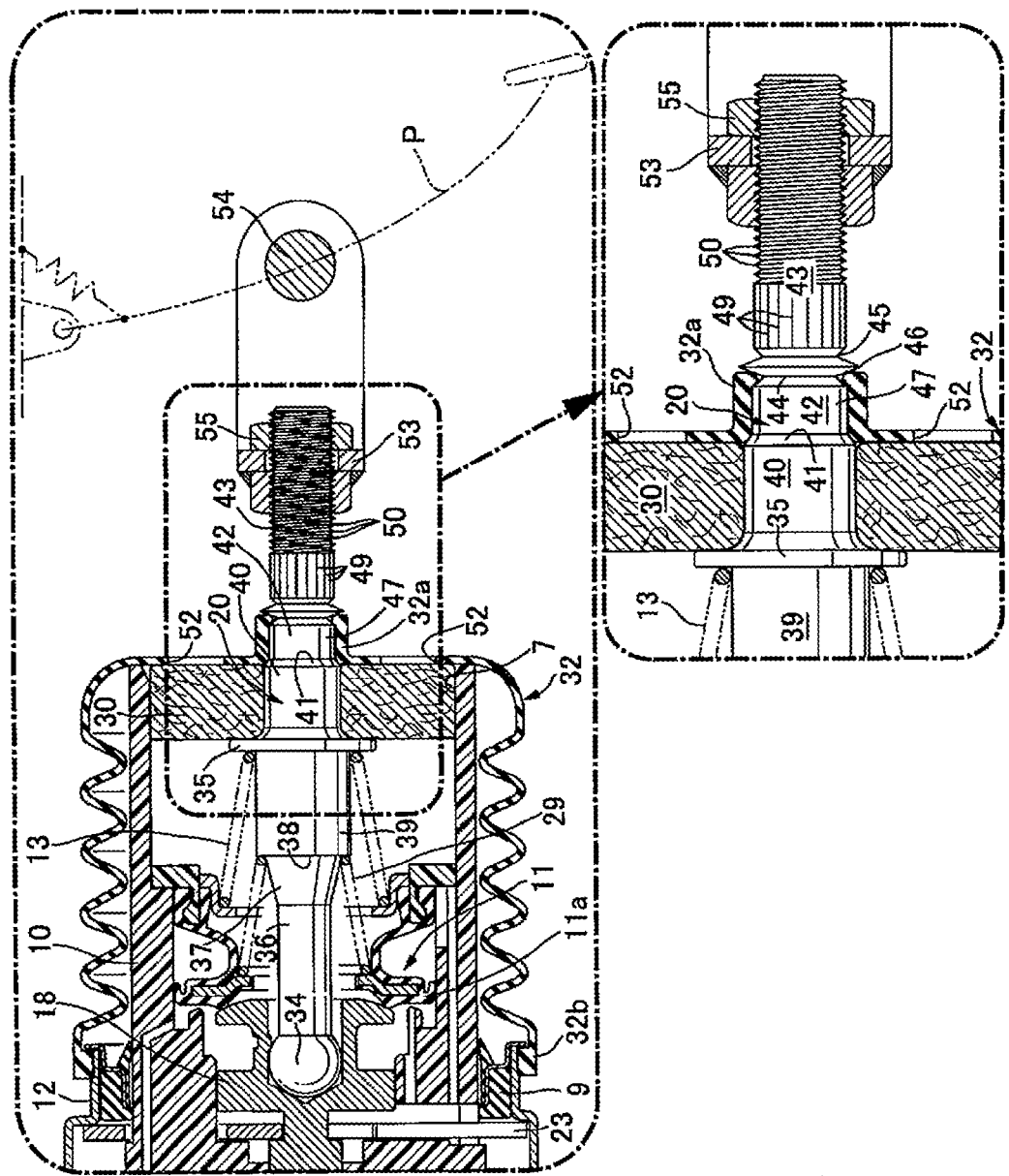
FIG. 2 is an enlarged view of a portion denoted by II in FIG. 1.
Figure 3:
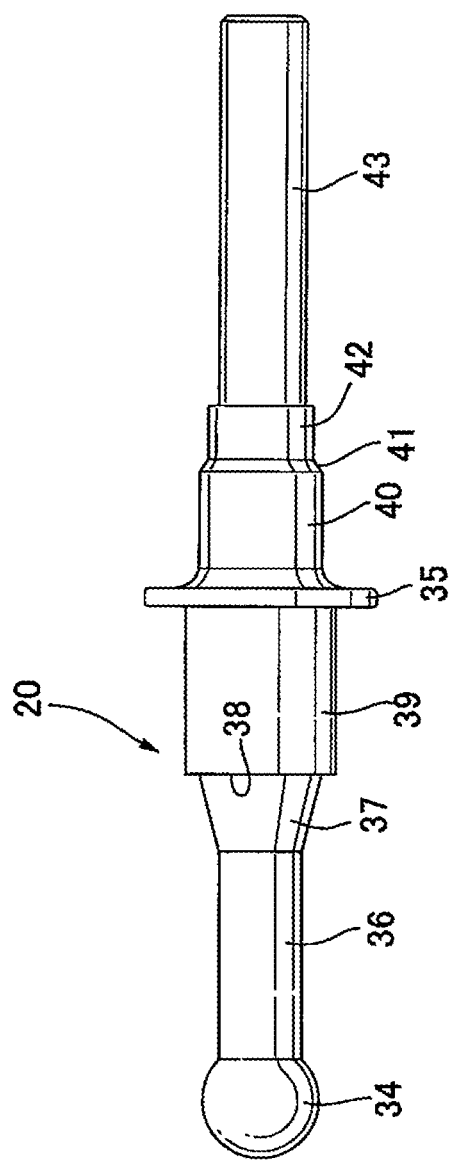
FIG. 3 is a side view of a forged, semi-finished input rod product.

Then, the input rod 20 will be described in detail by reference to FIG. 2.

The input rod 20 is made up of a ball joint 34, a first small-diameter shaft portion 36 that extends from the ball joint 34 to the rear, a large-diameter shaft portion 39 that continues to a rear end of the first small-diameter shaft portion 36 via a tapering portion 37 and a front facing step portion 38, a flange 35 that protrudes radially outwards from a rear end portion of the large-diameter shaft portion 39, a first middle-diameter shaft portion 40 that projects from a rear end face of the flange 35 and that has a diameter that is smaller than that of the large-diameter shaft portion 39, a second middle-diameter shaft portion 42 that continues to a rear end of the first middle-diameter shaft portion 40 via a rear facing step portion 41, and a second small-diameter shaft portion 43 that extends from a rear end of the second middle-diameter shaft portion 42 and that has a diameter that is smaller than that of the second middle-diameter shaft portion 42.

A pair of annular groove portions 44, 45 and a ridge portion 46 are formed on an outer circumferential surface of a rear portion of the second middle-diameter shaft portion 42. The annular grooves 44, 45 are formed so as to be aligned side by side in an axial direction and each have a triangular section. The ridge portion 46 rises in an annular fashion from roots of the groove portions 44, 45 and has a triangular section. This ridge portion 46 and the rear facing step portion 41 define an annular boot installing groove 47. Consequently, the rear facing step portion 41 constitutes a front side wall of the boot installing groove 47, an outer circumferential surface of the second middle-diameter shaft portion 42 constitutes a root of the boot installing groove 47, and the ridge portion 46 constitutes a rear side wall of the boot installing groove 47.

Serrations 49 are formed on a front portion of an outer circumference of the second small-diameter shaft portion 43, and external threads 50 are formed on a rear portion of the outer circumference of the same shaft portion.

In forming the input rod 20 having the construction described above, firstly, a round rod is forged to obtain a semi-finished input rod product 020 including a ball joint 34, a first small-diameter shaft portion 36, a tapering portion 37, a large-diameter shaft portion 39, a flange 35, a first middle-diameter shaft portion 40, a second middle-diameter shaft portion 42, and a second small-diameter shaft portion 43.

Next, a pair of annular groove portions 44, 45 each having a triangular section are formed on an outer circumferential surface of a rear portion of the second middle-intermediate shaft portion 42 so as to be aligned side by side in the axial direction through rolling, and the groove portions 44, 45 are widened towards each other while being so formed to thereby form an annular ridge portion 46 having a triangular section so as to rise between both the groove portions 44, 45. At the same time as the groove portions 44, 45 and the ridge portion 46 are so formed, serrations 49 and external threads 50 are formed on the second small-diameter shaft portion 43 also through rolling.

Thus, the ball joint 34 is connected continuously to the valve piston 18 so as to tilt in a rolling fashion. The front facing step portion 38 supports movably a rear end of the valve spring 29. The flange portion 35 supports movably a rear end of the input return spring 13. The first middle-diameter shaft portion 40 penetrates a central portion of the filter 30.

A rear end bead portion 32a that is formed on an inner circumference of a rear end portion of a boot 32 that covers an exposed outer circumferential surface of the valve cylinder 10 is installed in the boot installing groove 47 with a constant fastening margin, and the rear end bead portion 32a bites into the front groove portion 44 while being restricted from moving to the rear by the rear side wall of the boot installing groove 47, that is, the ridge portion 46.

A front end bead portion 32b that is formed at a front end portion of the boot 32 is installed on an outer circumference of the bearing cylinder 12. Plural through holes 52 are provided at the rear end portion of the boot 32 so as to permit the passage of the atmosphere to the filter 30.

A front end wall of a yoke 53 is screwed onto the external threads 50, and a lock nut 55 is screwed to be fastened onto the external threads 50 inwards of the yoke 53. The brake pedal P is connected to a fork portion of the yoke 53 via a pivot shaft 54. In fastening the lock nut 55, the serrations 49 are gripped on by means of a tool so as to prevent the rotation of the input rod 20.

According to the above-described embodiment, forming the annular groove portions 44, 45 at the two locations aligned side by side in the axial direction on the outer circumferential surface of the rear end portion of the second middle-diameter shaft portion 42 of the input rod 20 through rolling causes the annular ridge portion 46 having the triangular section to rise between the groove portions 44, 45. Then, the ridge portion 46 so formed is caused to constitute the rear side wall of the boot installing groove 47. Therefore, the boot installing groove 47 can easily be formed through rolling, and cuttings such as those produced in cutting are not produced, this contributing to a reduction in production costs.

The rear end bead portion 32a of the boot 32 that is installed in the boot installing groove with the fastening margin bites into the front groove portion 44, whereby the movement of the rear end bead portion 32a in the boot installing groove 47 can be restricted in an ensured fashion by making use of the groove portion 44.

In the input rod 20, the serrations 49 and the external threads 50 are formed on the second small-diameter shaft portion 43 through the same rolling as the rolling through which the groove portions 44, 45 and the ridge portion 46 are formed on the rear portion of the second middle-diameter shaft portion 42. Therefore, the boot installing groove 47, the serrations 49 and the external threads 50 can be formed altogether at one time through rolling, thereby making it possible to realize a further reduction in production costs.

The invention is not limited to the embodiment described above and hence can be altered variously in design without departing from the spirit and scope thereof. For example, the outer circumferential surface of the front portion of the second small-diameter shaft portion 43 can also be formed into a polygonal shape in place of the serrations 49 given thereto. The invention can also be applied to an input rod for a hydraulic brake booster.

The invention claimed is:

1. A brake booster input rod, comprising:
   a front end portion to which an input piston (18) of a brake booster (B) is connected;
   a rear end portion to which a yoke (53) connected with to a brake pedal (P) is attached; and
   an annular boot installing groove (47) formed on an outer circumferential surface of a middle portion of the input rod (20), so that, when a boot (32) covers a front portion of the input rod (20), the boot installing groove (47) is engaged with a rear end bead portion (32a) of the boot (32) with a fastening margin,
   wherein two annular groove portions (44, 45) are formed side by side on an outer circumferential surface of the input rod (20) along an axial direction thereof to each have a triangular section, and an annular ridge portion (46) are risen between the groove portions (44, 45) to have a triangular section; and
   wherein the ridge portion (46) is a rear side wall of the boot installing groove (47).

2. The brake booster input rod of claim 1,
   wherein the front groove portion (44) is formed so as to be bitten by the rear end bead portion (32a), when the rear end bead portion (32a) of the boot (32) is installed in the boot installing groove (47).

3. The brake booster input rod of claim 1,
   wherein the rear end portion of the input rod (20) includes an external thread (50) onto which the yoke (53) is screwed, and
   wherein the external thread (50) are formed through the rolling at which the groove portions (44, 45) and the ridge portion (46) are formed.

4. The brake booster input rod of claim 3,
   wherein the pair of annular groove portions (44, 45) and the ridge portion (46) are formed on the outer circumferential surface of the rear portion of the second middle-diameter shaft portion (42).

5. The brake booster input rod of claim 4,
   wherein the ridge portion (46) and the rear facing step portion (41) define the boot installing groove (47).

6. The brake booster input rod of claim 5,
   wherein the boot installing groove (47) is an annular boot installing groove (47).

7. The brake booster input rod of claim 6,
   wherein the rear facing step portion (41) constitutes a front side wall of the boot installing groove (47), the outer circumferential surface of the second middle-diameter shaft portion (42) constitutes a root of the boot installing groove (47), and the ridge portion (46) constitutes a rear side wall of the boot installing groove (47).

8. The brake booster input rod of claim 7, further comprising serrations (49) formed on a front portion of the outer circumference of the second small-diameter shaft portion (43), and external threads (50) formed on a rear portion of the outer circumference of the second small-diameter shaft portion (43).

9. The brake booster input rod of claim 8,
   wherein the groove portions (44, 45) are widened towards each other which forms the annular ridge portion (46) having the triangular section so as to rise between both the groove portions (44, 45).

10. The brake booster input rod of claim 1, further comprising:
    a ball joint (34) at the front end portion;
    a first small-diameter shaft portion (36) that extends from the ball joint (34);

a large-diameter shaft portion (39) that continues to a rear end of the first small-diameter shaft portion (36) via a tapering portion (37) and a front facing step portion (38);

a flange (35) that protrudes radially outwards from a rear end portion of the large-diameter shaft portion (39);

a first middle-diameter shaft portion (40) that projects from a rear end face of the flange (35) and that has a diameter that is smaller than that of the large-diameter shaft portion (39);

a second middle-diameter shaft portion (42) that continues to a rear end of the first middle-diameter shaft portion (40) via a rear facing step portion (41); and a second small-diameter shaft portion (43) that extends from a rear end of the second middle-diameter shaft portion (42) and that has a diameter that is smaller than that of the second middle-diameter shaft portion (42).

11. The brake booster input rod of claim 10,
wherein the ball joint (34) is connected continuously to a valve piston (18) so as to tilt in a rolling fashion.

12. The brake booster input rod of claim 11,
wherein the front facing step portion (38) supports movably a rear end of a valve spring (29),
wherein the flange portion (35) supports movably a rear end of an input return spring (13), and
wherein the first middle-diameter shaft portion (40) penetrates a central portion of a filter (30).

13. The brake booster input rod of claim 12,
wherein the rear end bead portion (32*a*) is formed on an inner circumference of a rear end portion of the boot (32) that covers an exposed outer circumferential surface of a valve cylinder (10) installed in the boot installing groove (47), and
wherein the rear end bead portion (32*a*) bites into a front groove portion (44) of the two annular groove portions (44, 45) while being restricted from moving to the rear by the rear side wall of the boot installing groove (47).

14. The brake booster input rod of claim 13,
wherein a front end bead portion (32*b*) that is formed at a front end portion of the boot (32) is installed on an outer circumference of a bearing cylinder (12), and
wherein plural through holes (52) are provided at the rear end portion of the boot (32) so as to permit the passage of the atmosphere to the filter (30).

15. The brake booster input rod of claim 14,
wherein a front end wall of a yoke (53) is screwed onto the external threads (50), and
wherein a lock nut (55) is screwed to be fastened onto the external threads (50) inwards of the yoke (53).

16. The brake booster input rod of claim 15,
wherein the rear end bead portion (32*a*) of the boot (32) is installed in the boot installing groove such that movement of the rear end bead portion (32*a*) in the boot installing groove (47) is restricted by the groove portion (44).

* * * * *